United States Patent [19]

Amano et al.

[11] Patent Number: 4,900,963
[45] Date of Patent: Feb. 13, 1990

[54] D.C. MOTOR

[75] Inventors: Hiroyuki Amano, Kariya; Tomoaki Nishimura, Toyoake; Toshinori Sasaki, Toyota, all of Japan

[73] Assignee: Aisin Seiki Kabushiki Kaisha, Aichi, Japan

[21] Appl. No.: 251,493

[22] Filed: Sep. 30, 1988

[30] Foreign Application Priority Data

Sep. 30, 1987 [JP] Japan ................. 62-246734

[51] Int. Cl.⁴ ............. H02K 23/42; H02K 21/26; H02K 21/00
[52] U.S. Cl. ................... 310/187; 310/154; 310/190; 310/193
[58] Field of Search ............ 310/154, 187, 190, 192, 310/193

[56] References Cited

U.S. PATENT DOCUMENTS 4,774,424  9/1988  Habermann ............ 310/187

FOREIGN PATENT DOCUMENTS 6153961  11/1981  Japan .................. 310/190

Primary Examiner—Patrick R. Salce
Assistant Examiner—Clayton Emanuello LaBalle
Attorney, Agent, or Firm—Sughrue, Mion, Zinn, Macpeak & Seas

[57] ABSTRACT

A D.C. motor is provided with a higher sustaining torque by providing an ascially extending slot on each tooth of an armature core. The slot is located in the center of the outer surface of each tooth opposite the field magnets.

3 Claims, 4 Drawing Sheets

D.C. MOTOR

BACKGROUND OF THE INVENTION

This invention relates to a D.C. motor, and more particularly relates to an improvement for sustaining torque when the motor is de-energized.

Referring now to FIG. 6, one example of a conventional D.C. motor 50 is explained. This conventional motor 50 includes four magnetic poles 52 for establishing a field magnet and an armature core 53. The armature core 53 further includes spindle 53a and five teeth 53b which project spokewise from the spindle 53a and face the magnetic poles 52.

This type of motor is utilized as an actuator as shown in FIG. 7. When the D.C. motor 50 is energized, the motor 50 stores energy in a torque storage mechanism 63 via a worm gear 61 and worm wheel 62. The torque storage mechanism 63 could be a spiral spring or the like. The stored energy is converted into liner movement by a rack 66 and a pinion 67 via reduction gears 64 and 65. The amount of stored energy is detected by an angle detector 68. The angle detector 68 de-energizes the motor 50 if the angle detector 68 detects a predetermined angular movement of the worm wheel 62. When the motor 50 is de-energized, the stored energy in the storage mechanism is transmitted to the motor 50 via the worm gear 61 and the worm wheel 62 and may cause the motor 50 to reverse. Therefore, the motor 50 has to have a minimum sustaining torque against the reaction of the torque storage mechanism 63.

However, only one tooth among the five teeth 53b is located directly in front of a magnetic pole 52 of the field magnet in the typical conventional D.C. motor 50 shown in FIG. 6. The other teeth 53b which are not directly in front of the magnetic poles 52 do not contribute to the sustaining torque sufficiently. Accordingly, the conventional D.C. motor does not have enough sustaining torque for overcoming the reaction of the storage mechanism 63.

SUMMARY OF THE INVENTION

Accordingly, one of the objects of the present invention is to provide a solution to overcome the conventional drawbacks.

Another object of the present invention is to provide a sustaining torque.

To achieve the above objects, and in accordance with the principles of the invention as embodied and broadly described herein, the D.C. motor includes at least one slot formed on each tooth of an armature core in order to partially enlarge the air gap between the tooth of the armature core and a pole of a field magnet.

Preferably, a permanent magnet can be used as the field magnet for minimizing the size of the D.C. motor. The poles of the permanent magnet may be positioned alternately on the same circumference with the same intervals. Further, the poles may have the same shape and size.

It is preferred that the slit is positioned at the center of the tooth to have the slot disposed opposite an end of a magnetic pole of the field magnet.

BRIEF DESCRIPTION OF THE DRAWINGS

The accompanying drawings, which are incorporated in and constitute a part of the specification, illustrate an embodiment of the invention and together with the description, serve to explain the principles of the invention wherein.

DETAILED DESCRIPTION OF THE PREFERRED EMBODIMENT

Figure 1:
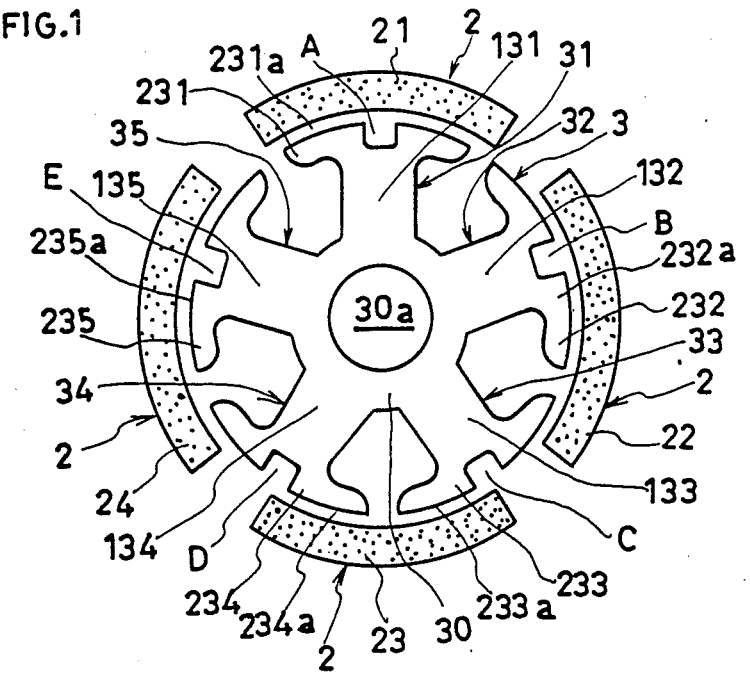
FIG. 1 is a cross sectional view of the present invention showing a stabilized position between an armature core and poles of a field magnet.

Reference will now be made in detail to the present preferred embodiment of the invention, an example of which is illustrated in the accompanying drawings.

A D.C. motor according to the preferred embodiment comprises a yoke 1, four poles 2 of the field magnet, an armature core 3 and a spindle 4.

The yoke 1 has a cylindrical shape with a bottom 11. The yoke 1 also has a projected portion 12 at the center of the bottom 11. A bearing portion 12a is secured in the projected portion 12. There is a metal bearing 4a in the bearing portion 12a. One end of the spindle 4 is supported by the metal bearing 4a. Further, a ball bearing 4b is disposed at the other end of the spindle 4. The yoke 1 is formed by pressing a carbon steel sheet having 1.6 mm thickness. A length L is established as 35.7 mm and an internal diameter $O_1$ is established as 47.2 mm.

The poles 2 of the field magnet comprise two permanent magnets 21 and 23 with the "N" pole at the front of the armature 3 and two permanent magnets 22 and 24 with the "S" pole at the front of the armature 3. Each one of the magnets 21, 22, 23 and 24 are fixed to the inside of the yoke 1 by an adhesive. The magnets 22, 23, 24 and 25 are positioned alternately at 90° intervals in the circumferential direction. Accordingly, the "N" poles are in opposition to each other at 180° intervals and the "S" poles are also opposed each other at 180° intervals. Respective magnets 21, 22, 23 and 24 have arc-shaped outer surfaces 21a, 22a, 23a and 24a, and inner surfaces 21b, 22b, 23b and 24b. Each magnet 21, 22, 23 and 24 has a 5.0 mm thickness and has a 26.5 mm length $l_1$. Each magnet 21, 22, 23 and 24 has the same shape and the same size. Further the inner surfaces 21b, 22b, 23b and 24b are on the same circumference which has a diameter $O_2$ about 37 mm. Both sides of each magnet 21, 22, 23 and 24 have a predetermined width $\alpha$ corresponding to 72°. Predetermined intervals are provided between each magnet 21, 22, 23 and 24. Each interval has a predetermined width $\beta$ corresponding to 18°. In this embodiment, "FB3B" magnets supplied by Tokyo Denki Kagaku Co., Ltd. are used as permanent magnets 21, 22, 23 and 24.

The armature core 3 comprises a spindle portion 30 and five teeth 31, 32, 33, 34 and 35 which are projected spokewise from the spindle portion 3 toward the magnets 21, 22, 23 and 24. The spindle portion 30 includes a spindle opening 30a where the spindle 4 is inserted. The teeth 31, 32, 33, 34 and 35 further comprise spoke portions 131, 132, 133 and 134 and end portions 231, 232, 233, 234 and 235 which are formed at the ends of the spoke portions 131, 132, 133, 134 and 135. Each tooth 31, 32, 33 and 34 is positioned with 72° of predetermined interval a. The end portions 231, 232, 233, 234 and 235 have larger widths than the spoke portions 131, 132, 133 134 and 135. Outer surfaces 231a, 232a, 233a, 234a and 235a are on a circle having a 36mm diameter. An air gap with about 0.5 mm width is provided between the outer surfaces 231a, 232a, 233a, 234a and 235a and inner surfaces 21b, 22b, 23b and 24b of each magnet 21, 22, 23 and 24. Further, there are the other air gaps with about 2.5 mm width between each of the end portions 231, 232, 233 and 234.

Five slots A, B, C, D and E are provided at the center of each end portion 231, 232, 233, 234 and 235. These slots A, B. C, D and E are extending along the same direction as the spindle opening 30a. Each slot A, B, C, D and E are extending along the same direction as the spindle opening 30a. Each slot A, B, C, D and E has the same shape with 2.5 mm depth d and 2.5 mm width w. The axial length $l_2$ is established as about 17 mm.

The spindle 4 is the rotational axis of the armature core 4. The spindle 4 is fixed in the spindle opening 30a.

In order to compare the motor according to the present embodiment with the conventional motor, an experiment is executed.

EXPERIMENT

Figure 6:
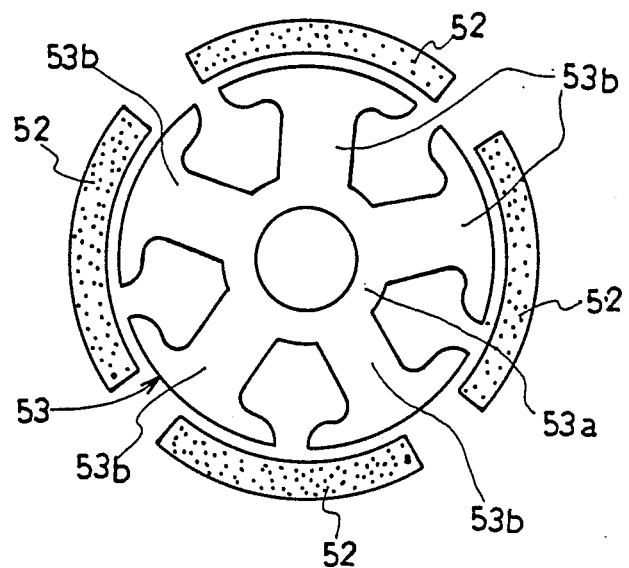
FIG. 6 is a cross sectional view of a conventional D.C. motor.
Figure 7:
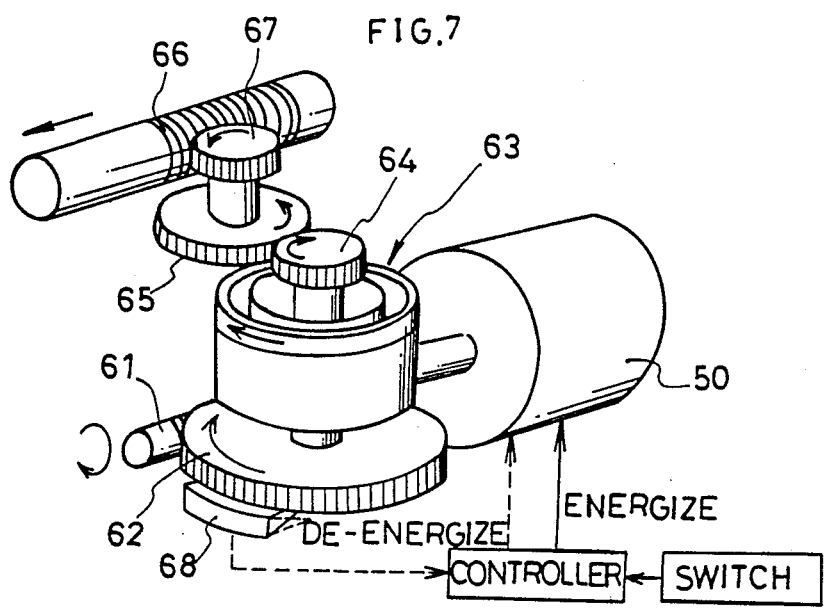
FIG. 7 is a perspective view of an actuator in which a D.C. motor is utilized.

Each sustaining torque according to the present embodiment typically shown in FIG. 1 and the conventional motor typically shown in FIG. 6, is measured by a torque gage at a normal temperature. The conventional motor is the same as the motor of the present embodiment except for the existence of the slots or grooves A, B, C, D and E.

As a result of this experiment, the sustaining torque according to the motor of the present invention was 220 g cm and the sustaining torque according to the conventional motor was 170 g cm.

These results clearly show that the slots A, B, C, D and E increase the sustaining torque.

In the FIG. 1, the armature core 3 is under a stabilized condition with respect to the magnetic poles 2 of the field magnet. Under this condition, the magnet 21 faces the out surface 231a of the tooth 31, and the center of the magnet 21 coincides with the center of the tooth 31. Meanwhile, the magnet 23 faces both outer surfaces 233a, 234a of two teeth 33 and 34 equally. Under such conditions, the flux which flows from the magnet 23 to the tooth 33 comes into the magnet 22 via the end portion 233. Further, the flux which flows from magnet 23 to the tooth 34 comes into the magnet 24 via the end portion 234. A clockwise torque may be generated on the tooth 33 and a counter-clockwise torque may be generated on the tooth 34. Both torques may be cancelled with respect to each other. However, in the present embodiment, wherein slots C and D are provided, two magnetic paths go around the slots C and D since the slots C and D enlarged the air gap between the magnet 23 and the end portions 234 and 235. Accordingly, the clockwise torque and the counter-clockwise torque are balanced with a more smaller force. Therefore, the instability of the torque balance may be reduced and thus, the sustaining torque increased.

Figure 5:
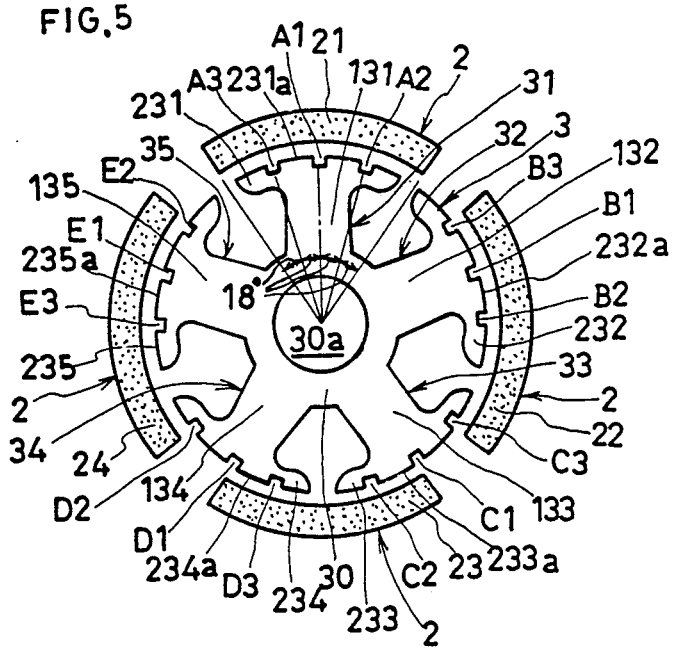
FIG. 5 a cross sectional view showing a stabilized position between an armature core and poles of field magnet according to second embodiment of the present invention.
Figure 2:
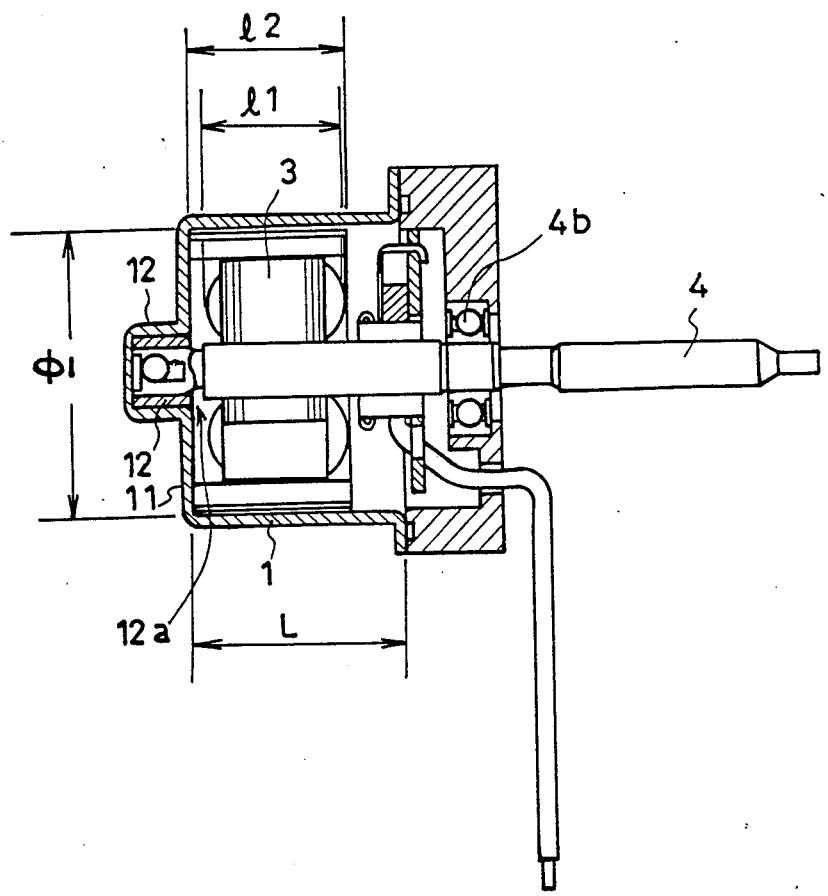
FIG. 2 is a longitudinal sectional view of the present invention showing a D.C. motor.
Figure 3:
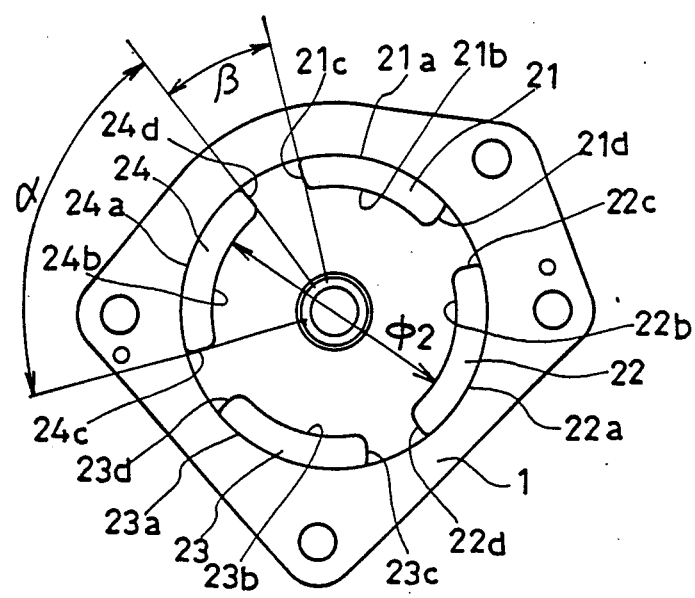
FIG. 3 is a cross sectional view of the present invention showing an arrangement of poles of a field magnet.
Figure 4:
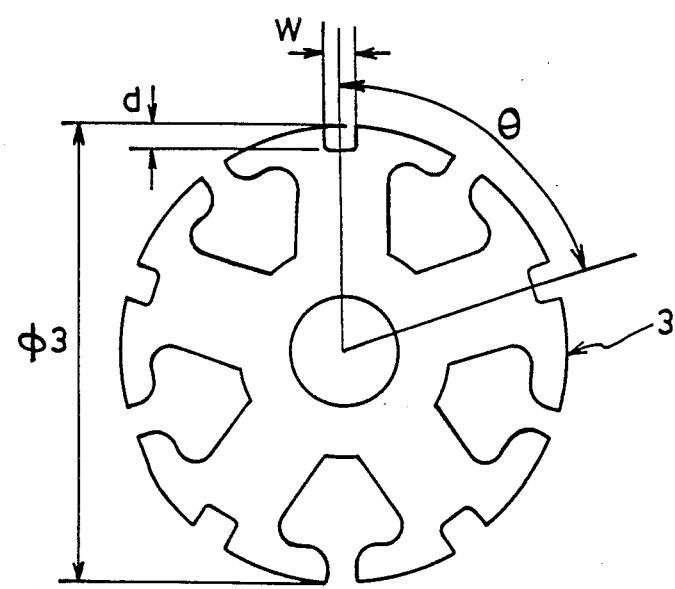
FIG. 4 is a cross sectional view of the present invention showing an armature core.

Various modifications may be made in the invention without departing from the scope or spirit of the invention. For example, as shown in FIG. 5, a plurality of slits A1-A3, B1-B3, C1-C3, D1-D3 and E1-E3 may be made on the end portions 231, 232, 233, 234 and 235 in order to improve the sustaining torque even more.

What is claimed is:

1. A D.C. motor comprising at least two circumferentially spaced apart squared field magnet means and a rotatable armature core means with at least three teeth wherein each tooth has a plurality of axially extending slots with a rectangular cross section disposed on an end surface of each tooth with one of said slots being located centrally of each tooth for enlarging the air gap between said magnets and said core, said magnet means having a circumferential extent and spacing and each tooth of said core means having a circumferential extent such that when one tooth is disposed in complete overlapping relation with one of said magnet means the ends of the opposed magnet means will be disposed in alignment with said centrally located slots in adjacent teeth respectively whereby said magnet means and said core means provide an increase in cogging force.

2. A D.C. motor as set forth in claim 1 wherein said magnet means is comprised in four circumferentially spaced apart magnets which are provided in diametrically opposed pairs and said core means is provided with five equally spaced apart teeth.

3. A D.C. motor as set forth in claim 1 wherein said field magnetic means are permanent magnets.

* * * * *